March 10, 1936.    J. DE LA CIERVA    2,033,571

AIRCRAFT HAVING FREELY ROTATIVE SUSTAINING MEANS

Filed June 16, 1932    3 Sheets-Sheet 1

*Fig.1.*

INVENTOR.
Juan de la Cierva
BY
Symestreatt & Lechner
ATTORNEYS.

INVENTOR.
Juan de la Cierva
BY
ATTORNEYS.

UNITED STATES PATENT OFFICE 2,033,571

AIRCRAFT HAVING FREELY ROTATIVE SUSTAINING MEANS

Juan de la Cierva, Madrid, Spain, assignor to Autogiro Company of America, Philadelphia, Pa., a corporation of Delaware Application June 16, 1932, Serial No. 617,500
In Great Britain June 22, 1931

9 Claims. (Cl. 244—19)

The present invention relates to aircraft of the type having a sustaining rotor consisting of a central hub rotatively mounted to turn about a substantially vertical axis and a plurality of blades mounted thereon, the whole being normally rotated by relative air-flow such as is caused by the motion of the aircraft through the air.

In aircraft of this type it has been usual hitherto to mount the rotor hub at the apex of pyramidal pylon structure rising from the upper side of the body, and, in order to provide sufficient clearance between the rotating blades and the tail members of the aircraft and also between the rotor blades and the airscrew, the pylon structure has had to be of considerable height.

While the pylon structure has been found to be a suitable means of mounting the rotor, more especially in air craft having open cockpits, it is subject to certain disadvantages; more particularly it gives rise to considerable head resistance, since a very bad aerodynamic shape is presented by the apex of the pylon at which three or more struts converge at a sharp angle, excessive head resistance being caused by the interference of the air streams flowing round the converging struts and the apex member.

According to the present invention, in an aircraft including a sustaining rotor of the type referred to, the body or fuselage of the aircraft is provided with an upwardly extending part or continuation, enclosing, incorporating or of itself forming the structural means necessary for supporting the rotor and for transmitting the lift and other forces thereof to the aircraft.

In external appearance the body of an aircraft according to this invention presents a "hump", at the summit of which is located the rotor hub. This hump is smoothly faired or stream-lined into the rest of the body and substantially completely encloses the structural member or members supporting the rotor hub. Alternatively, the skin or shell of the hump may itself be a load-carrying member.

The present invention while not restricted in its application thereto, is particularly advantageous for aircraft of the cabin type in which the crew are totally enclosed within the body, in which case the hump will normally be located above, or as a part or continuation of, the cabin.

A further object of the invention involves the mounting or enclosure of the bearings in which the rotor hub rotates, and associated parts, within the hump or pylon structure, whereby such parts are streamlined into the streamlining of the pylon itself, and further are protected from the weather.

An especial advantage is obtained in aircraft of this type wherein rotor braking means, and/or means of imparting a starting or assisting torque to the rotor from the propulsive engine, are provided. Such means, in general, comprise driving elements including shafts, gear wheels, gear housings and the like, and braking elements such as drums etc., some of which in an aircraft having a normal open type pylon are necessarily exposed and tend to cause substantial head resistance owing to their bulk and bad aerodynamic shape.

According to a further feature of the present invention all such devices are preferably completely housed within the body, hump, or pylon, thus effecting considerable reduction of head resistance, and protecting the parts.

A further and very decided operational advantage is obtained from the effect of the side or "fin" area of the aforementioned hump, said fin area being above the centre of gravity of the craft, so that it has a beneficial effect on the lateral stability of the aircraft. In fact, the additional fin area thus produced above the centre of gravity so co-operates with the machine as a whole and with the relationship between the rotor lift-line and the centre of gravity, that the size and area of the up-turned fixed wing tips now usually employed in this type of machine may in some instances be reduced, with resultant structural and other advantages and without diminishing the stability of the craft.

The invention further contemplates the prolongation of the hump backwards to increase the said fin area and to bring its centre of pressure well back so as to improve directional stability, the hump being smoothed or faired into a flat vertical tail fin. This arrangement is particularly advantageous if a slight driving torque is at any time applied to the rotor in flight, since the torque reaction tends to turn the aircraft off its course, and the large fin area aft of the centre of gravity of the aircraft is of great use in resisting said torque reaction.

According to another feature of the invention a part or parts of the outer covering of the hump, or body part incorporating the rotor supports, may be made easily removable for the sake of ease of inspection of and access to the rotor hub, the rotor supporting elements, and parts of the mechanical rotor-driving device where such is provided.

Still further, the structural unification of cabin and pylon may be utilized, in accordance with this invention, to produce ruggedness of both, with minimum weight, and to minimize interference with the free, normal, flow of the air-currents which in flight normally actuate the rotor.

The above-outlined nature of the present invention, and other objects and advantages, will be more fully understood from the following description of embodiments thereof with reference to the accompanying drawings, of which:—

Fig. 1 is a view in side elevation of an aircraft having a sustaining rotor of the general type referred to, with one of the rotor blades or wings partly broken-away, and illustrating one embodiment of the invention;

Figure 2:
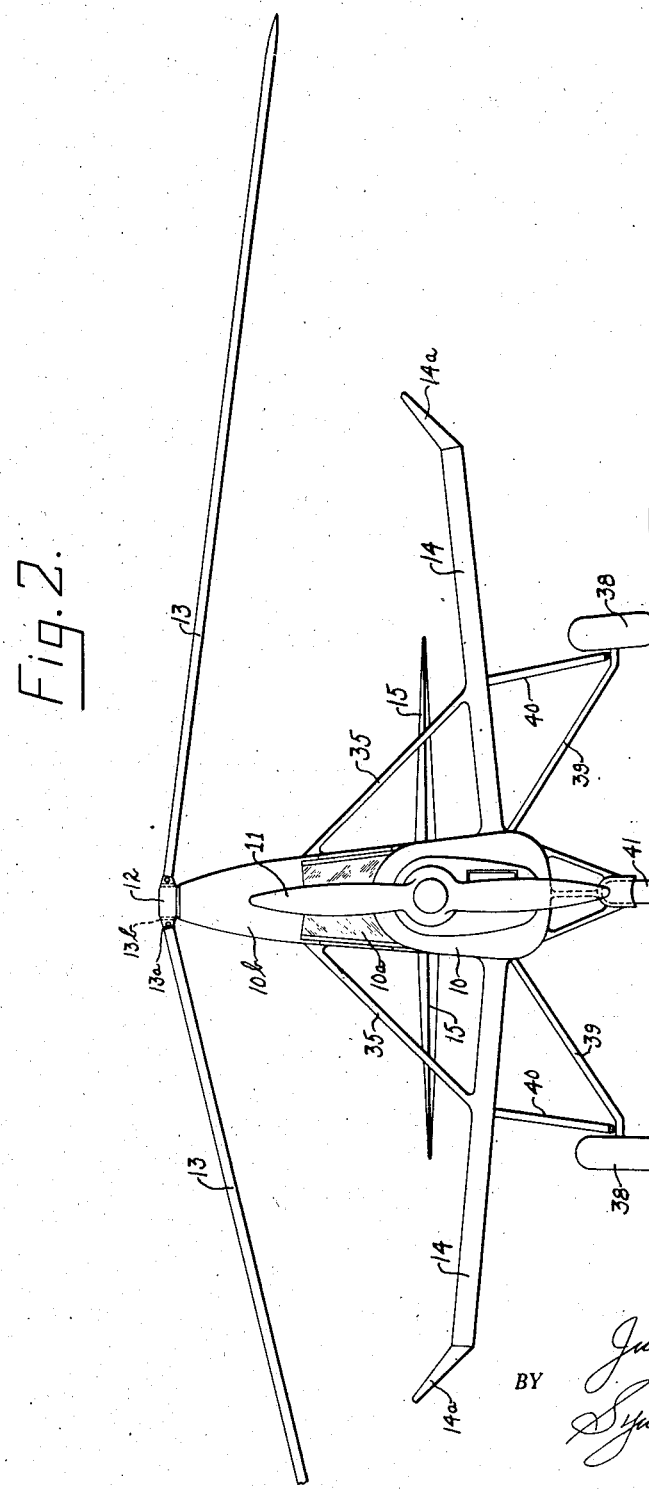
Fig. 2 is a view of the same aircraft in front elevation.

Referring first to Figs. 1 and 2 of the drawings:—

The aircraft comprises a body or fuselage 10, tractor airscrew 11 and a sustaining rotor having blades 13 attached to a central rotative hub 12, as by horizontal and vertical pivot pins 13a, 13b. The aircraft further comprises auxiliary fixed wings 14 with relatively small upturned tips 14a, horizontal tail plane 15, elevators 16 and rudder 17. The body 10 includes or is extended to form an enclosed cabin 10a for pilot and passenger (with seats indicated at 18, arranged in tandem) so that a good streamline cabin structure results; and as a part or continuation of the cabin 10a is provided the streamlined hump or stress-carrying pylon 10b which may house the rotor hub and associated parts, and which may be a rigid casing structurally unified with the main structural elements of the cabin and provide also for additional head-room therein, if desired. The merging of the structure, 10, 10a, 10b, into the elongated vertical fin 33, to provide a large total fin area above and toward the rear of the centre of gravity G, is clearly seen in Fig. 1.

Figure 3:
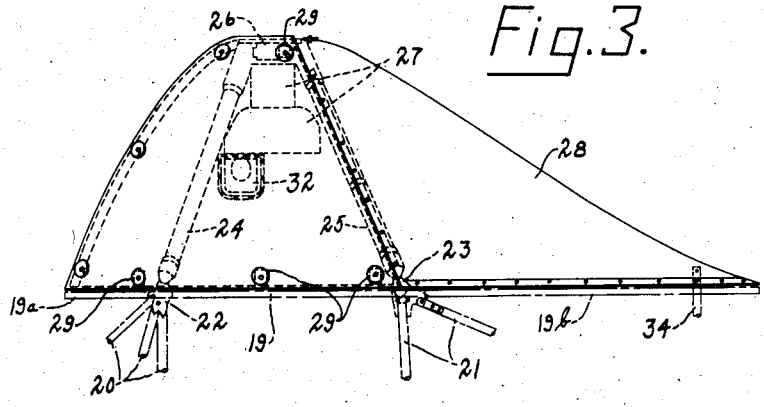
Figs. 3 and 4 are detail views on a larger scale, in side elevation and plan, respectively, showing a modified form of rotor mounting structure.
Figure 4:
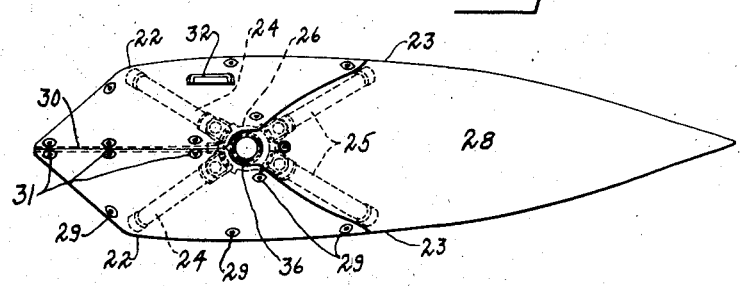

Referring now to the modification of Figs. 3 and 4; the body may include longitudinal horizontal structural members 19 arranged at the level of the cabin top and secured at their forward and rear ends 22, 23, respectively, to body or cabin bracing members 20, 21; forwardly and rearwardly converging structural members 19a, 19b, being also preferably provided. The rear junction points 23 may be at the points of attachment of the external struts 35 by which the fixed wings 14 are also braced. Thus the members 19, 20, 21 form an integral part of the body structure. In this form of construction, the rotor mount may be made of a pyramidal structure consisting of two pairs of struts 24 and 25 whose lower ends are anchored at the points 22, 23 respectively, their upper ends being secured to an apex member 26 to which is attached a casing 27 which contains the bearings in which the hub member 12 is supported, together with gearing and the like forming part of a rotor starting device having an ultimate connection with the propulsive engine of the craft. The casing 27 may also contain a rotor braking device.

The whole of the structural arrangements including struts 24, 25 and the apex member 26 and the casing 27 are enclosed within a sheet metal or other suitable skin 28 which is made of good stream-lined form. This cover, casing, or shell 28 is secured by easily detachable clips 29 to the upper edge of the body proper and to the apex member 26; and further may be split down the front at 30 for easy removal, clips 31 being provided for closing the split when the casing is in place. The only member to project from the hump is the upper end of the rotor hub member 12, the apex member 26 being provided with an aperture at 36 for this purpose.

An inspection door 32 is provided in the side of the shell or casing 28 for lateral access from the exterior to the structural members and the casing 27. The rear part of the shell or enclosure 28 may be faired into the fairing 33 arranged on the upper rear part of the body 10, (similar to the arrangement of Fig. 1) and may be secured thereto as by lugs 34 in Fig. 3. The fairing 33 tapers rearwardly to a flat fin whose contour merges into that of the rudder 17.

In either form of construction, a cabin door 37 may be provided, and located just over the fixed wing 14 which may be used as a step. Beneath each fixed wing is a landing wheel 38, mounted by means of struts 39 and shock-absorbers 40; this general arrangement co-operating with the cabin and fuselage structure and with the fixed-wing braces 35 to provide a good stout structure. Beneath the front end of the body is preferably arranged a third wheel 41, and beneath the tail a skid 42. The machine thus has two positions of stable equilibrium on the ground; and after alighting, for example, on the skid 42 and wheels 38, it may be brought up into a horizontal position for loading and unloading of the passengers.

I claim:—

1. In an aircraft having a normally air actuated sustaining rotor, a body beneath said rotor including a cabin structure and an upwardly extending hump or pylon for securing the rotor to the top of the cabin structure, an undercarriage including an alighting element located centrally of the body, laterally considered, and a main compression means for said element extending upwardly in substantial, longitudinally inclined, alignment with similarly inclined upright structural portions of said body, cabin and hump.

2. In an aircraft having a normally air actuated sustaining rotor, a body beneath said rotor including a cabin structure and an upwardly extending hump or pylon for securing the rotor to the top of the cabin structure, an undercarriage including a pair of main landing wheels spaced-apart laterally of the craft, with bracing means to said body and cabin, a supplemental landing wheel forwardly of the main wheels and located centrally of the body, laterally considered, a main compression element extended upwardly from the supplemental wheel and centrally of the body and approximately in line with upright structural elements of said cabin and hump, and a pair of diagonal braces for said supplemental wheel, extended to the body adjacent the sides thereof.

3. In an aircraft, a sustaining rotor normally primarily actuated by relative air-flow, a body beneath said rotor, a substantially streamlined hump upon the top of the body at the summit of which the rotor is mounted, and a vertical fin or prolongation of said hump extending rearwardly therefrom.

4. In an aircraft, an autorotative sustaining rotor normally primarily actuated by relative air-flow, a body beneath said rotor, a narrow, longitudinally streamlined hump upon the top of the body at the summit of which the rotor is mounted, and vertical fin means of considerable area behind said hump, substantially all the area of said hump and fin means being above the center of gravity of the aircraft, said hump further being formed to a streamline upper contour viewed in side elevation, and being shaped to a streamline section viewed in plan, whereby to effect a combined reduction of drag of the rotor mount, stabilization of the craft and minimization of interference with the autorotational actuation of the rotor.

5. In an aircraft, a sustaining rotor normally primarily actuated by relative air-flow, a body having a cabin below the rotor and formed of tubular framing, and a narrow, longitudinally-extended, streamlined, hollow, stress-carrying shell crowning the cabin and secured to the tubes of said framing, and means for mounting the rotor compactly located in the top of said shell and terminating above the body of the craft.

6. In an aircraft having a normally air actuated sustaining rotor, a body beneath said rotor including a cabin structure and an upwardly extending hump or pylon for securing the rotor to the top of the cabin structure, an undercarriage including an alighting element located centrally of the body, laterally considered, and a main compression means for said element extending upwardly and longitudinally inclined in substantial alignment with similarly inclined upright structural portions of said body, cabin and hump.

7. In an aircraft having a normally air actuated sustaining rotor, a body beneath said rotor including a cabin structure and an upwardly extending hump or pylon for securing the rotor to the top of the cabin structure, an undercarriage including a pair of main landing wheels spaced-apart laterally of the craft, with bracing means to said body and cabin, a supplemental landing wheel forwardly of the main wheels and located centrally of the body, laterally considered, a main compression element extended upwardly from the supplemental wheel and centrally of the body and approximately in line with upright structural elements of said cabin and hump, and a pair of diagonal braces for said supplemental wheel, extended to the body adjacent the sides thereof.

8. In an aircraft, an autorotative sustaining rotor normally primarily actuated by relative air-flow, a body beneath said rotor, a narrow, longitudinally streamlined hump upon the top of the body at the summit of which the rotor is mounted, and vertical fin means of considerable area behind said hump, substantially all the area of said hump and fin means being above the center of gravity of the aircraft, said hump further being formed to a streamline upper contour viewed in side elevation, and being shaped to a streamline section viewed in plan, whereby to effect a combined reduction of drag of the rotor mount, stabilization of the craft and minimization of interference with the autorotational actuation of the rotor, and rotor starter mechanism associated with the rotor axis and enclosed within said streamlined hump.

9. In an aircraft, an autorotative sustaining rotor, normally primarily actuated by the relative air-flow in flight, a body beneath the rotor and having a propeller and upstanding tail surfacing, said rotor comprising a central upright hub or axis and a plurality of elongated wings pivotally mounted thereon, structural means extending upwardly from the top of the body and mounting said rotor hub at a substantially elevated position whereby the pivoted rotative wings have ample clearance over the propeller and tail surfacing, an occupant's compartment or cabin located in the body beneath the rotor hub, and an enclosure for the top of said compartment which is extended upwardly around and supported by said rotor-supporting structural means, said enclosure further being formed to an aeroform contour around said structural means and being positioned above the center of gravity, whereby to serve as a lateral stabilizing surface and to minimize the drag of the said structural means and occupant's compartment and smooth out the air-flow passing to the rotor and tail surfacing at the rear.

JUAN DE LA CIERVA.

CERTIFICATE OF CORRECTION.

Patent No. 2,033,571. March 10, 1936.

JUAN DE LA CIERVA.

It is hereby certified that error appears in the printed specification of the above numbered patent requiring correction as follows: Page 2, second column, strike out lines 35 to 63 inclusive, comprising claims 1 and 2, and for the claim numbers 3, 4, 5, 6, 7, 8 and 9 read 1, 2, 3, 4, 5, 6 and 7 respectively; and that the said Letters Patent should be read with these corrections therein that the same may conform to the record of the case in the Patent Office.

Signed and sealed this 9th day of June, A. D. 1936.

(Seal)

Leslie Frazer
Acting Commissioner of Patents.